United States Patent [11] 3,584,182

[72] Inventors J. Vincent Volk;
John McQueen, both of Bloomfield, N.J.
[21] Appl. No. 829,065
[22] Filed May 29, 1969
[45] Patented June 8, 1971
[73] Assignee Griffiths Electronics, Inc.
Linden, N.J.

[54] METHOD AND APPARATUS FOR PRECISION LOADING AND WELDING OF COMPONENTS IN AN ELECTRON DEVICE
10 Claims, 14 Drawing Figs.
[52] U.S. Cl..................................................... 219/87, 29/593, 73/37.5
[51] Int. Cl..................................................... B23k 11/00
[50] Field of Search........................................... 219/87, 78; 29/407, 593; 73/37.5, 37.7

[56] References Cited
UNITED STATES PATENTS
3,400,573 9/1968 Matter.......................... 73/37.5

Primary Examiner—J. V. Truhe
Assistant Examiner—J. G. Smith
Attorney—Ostrolenk, Faber, Gerb & Soffen ABSTRACT: Cathodes employed in an electron gun assembly are loaded and positioned in precise alignment relative to associated components of the gun assembly by means of a probe. The cathode loading assembly roughly positions the cathode within a supporting cylinder. An opening in the control grid receives a probe forming part of an air gauge having a float in its air column. A fine adjustment is made by operating a hand-wheel to precisely locate the cathode relative to the grid. The exact adjustment is indicated by positioning the float within tolerance markers while making the fine adjustment. The reading of the air gauge indicates back pressure imposed on the air escaping from the orifice of the probe. Once precisely located, a welding unit is activated, which moves the welding electrode into contact with the cathode support to secure the cathode by welding in its precise location. The welding assembly is retracted, the next cathode and cathode supports is placed into loading position, and the above operations are repeated wherein loading and welding of cathodes within an electron structure is performed in a rapid reliable and substantially automatic fashion.

INVENTORS
J. VINCENT VOLK
JOHN McQUEEN
BY
OSTROLENK, FABER, GERB & SOFFEN
ATTORNEYS

METHOD AND APPARATUS FOR PRECISION LOADING AND WELDING OF COMPONENTS IN AN ELECTRON DEVICE

The present invention relates to electron devices, and more particularly to a novel method and apparatus for precisely locating components of the electron devices within the structure and then automatically welding these components in their precisely determined positions.

Electron discharge devices are usually comprised of a number of components which must be precisely located relative to one another in order to achieve the desired operating characteristics. For example, in the case of electron gun structures, it is quite important to precisely locate the electron-emitting cathode of such devices relative to the control grid in order to generate electron beams having precise beam diameters and being capable of accurate intensity regulation.

One typical and rather widespread use for such electron gun structures is in the field of television, and especially television reception wherein highly accurate control of electron beam diameter and beam intensity must be provided in order to reproduce an image having the desired sharpness and contrast. Color television receiver tubes of the shadow mask type employ electron gun structures having three separate electron guns disposed at 120° intervals and aligned at a slight angle relative to the receiver tube longitudinal axis so as to generate three relatively closely spaced beams which, after deflection, are caused to pass through apertures in the shadow mask and strike only phosphor dots associated with the respective electron beam so as to produce a color image of good color purity. The spacing between the electron-emitting cathode and associated control grid of each electron gun is quite critical since the spacing has a direct effect upon the ability of the color receiver tube to produce a color image of good sharpness, contrast and color purity.

The cathode and grid components of each electron gun are relatively small in size and the critical spacing therebetween is likewise small, making the precise location of these components extremely complex and tedious. The positioning operation is still further complicated by the fact that it is not possible, due to the configuration of the components, to visually observe the spacing between the components for measurement purposes during the positioning operation.

The present invention is characterized by providing a novel method and apparatus for accurately positioning the cathode and grid components relative to one another through the use of an air gauge which enables highly accurate positioning of the components by means of a fine adjustment device in conjunction with the air gauge which may be observed during the fine adjustment operation to be assured of very accurate positioning of these components. The present invention is further characterized by providing novel welding apparatus for automatically welding the cathode and cathode support elements immediately after accurate positioning of the cathode relative to the grid and further for retracting the welding device rapidly to position each electron gun structure of either the single or three-gun types in alignment with the cathode loading device to perform the operations in a simple, rapid and yet highly reliable manner.

The apparatus of the present invention is comprised of a reciprocally mounted mandrel assembly having means for releasably mounting a cathode, and a probe assembly for mounting the electron gun structure. Means are activated to move the mandrel toward the electron gun assembly and thereby roughly position the cathode relative to its associated control grid. Fine adjustment of the cathode positioning is performed by manipulation of a handwheel in conjunction with the observation of an air gauge whose probe is inserted through the grid opening. The amount of back pressure imposed upon the air passing between the probe orifice and the bottom face of the cathode controls the height of a float within the column of the air gauge assembly. By operating the fine adjustment wheel, the float may be positioned between a pair of tolerance markers which assures accurate positioning of the cathode relative to its associated grid.

As soon as the cathode is precisely located, a welding apparatus is activated such that a cam device drives slidable welding units toward the cathode support of the cathode being welded. The mandrel which releasably positions the cathode further serves as a common electrode of the welding device, which is energized, after movement of its plural first electrodes into contact with the cathode support, so as to weld the cathode to the cathode support at a plurality of points while the cathode is being held in the precise location.

The welding assembly preferably comprises three welding units displaced at 120° intervals about the electron gun structure. The units are retracted after welding the next electron gun of the three-gun structure to be placed in position for loading and welding of its cathode. This operation is repeated for the remaining two-gun structures. The above method and apparatus provides a simple, rapid and yet reliable technique for accurately loading and welding cathodes within electron gun structures.

It is, therefore, one object of the present invention to provide a novel method and apparatus for loading and welding components of an electronic device through the use of an air gauge technique.

Another object of the present invention is to provide a novel method and apparatus for loading and welding components of an electronic device wherein the region of accurate spacing between the components is quite critical and is not capable of being observed during the loading operation.

Yet another object of the present invention is to provide a novel method and apparatus for accurately and precisely positioning components within an electronic device by means of an air gauge assembly having a probe positioned in the region where the accurate positioning is desired and the fine adjustment device is manipulated while viewing the air gauge display to assure accurate positioning of the components.

Still another object of the present invention is to provide novel means for welding accurately positioned parts within an electronic device wherein the loading probe serves the additional function of operating as one electrode of the welding unit.

Another object of the present invention is to provide novel apparatus for carrying out all of the above-mentioned objects in a rapid and substantially automatic fashion.

Still another object of the present invention is to provide novel apparatus for welding precisely located components within an electronic device and which is further provided with means for simultaneously welding components of an electronic device at selected angular positions and for repetitively performing similar welding operations upon a plurality of components within a single electronic structure.

These as well as other objects of the present invention will become apparent when reading the accompanying description and drawings in which:

FIG. 1b shows a top view of the electron gun structure of FIG. 1a.

FIG. 3b shows a side elevational view of the apparatus of FIG. 3a.

FIG. 5b shows an elevational view, partially sectionalized, of the welding assembly of FIG. 5a.

Figure 1A:
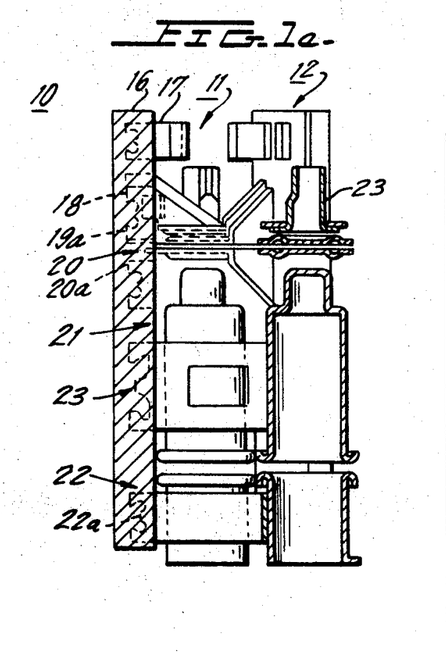
FIG. 1a shows an elevational view, partly sectionalized, of an electron gun structure which may be fabricated through the method and apparatus of the present invention.
Figure 1B:
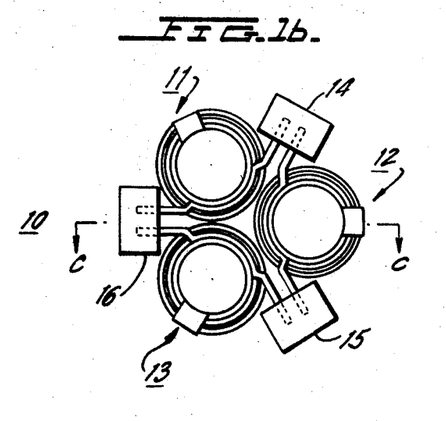

FIGS. 1a and 1b show elevational and top views, respectively, of a three-gun electron gun structure typically employed in color receiver tubes of the shadow mask type. The structure 10 is a partially fabricated structure which has been assembled up to the point where it is to receive a cathode. The structure is comprised of three electron guns 11, 12 and 13 whose components are appropriately mounted to associated supports which, in turn, are embedded within elongated insulated supports 14 through 16. For example, considering the electron gun 11, there is provided a bead support 17 (there are six in all) for mounting the bead containing the connecting pins; a support 18 for mounting the cathode support and shield (three of which are provided); a first grid assembly 19, and its associated support 19a (three of which are provided); a second grid assembly 20 and its associated support 20a (three of which are provided for each gun); a third grid assembly 21 and its associated support 21a (three of which are provided); and a fourth grid assembly 22 and its associated support 22a (three of which are provided).

Considering the electron gun 12 shown sectionalized in FIG. 1a, the cathode is loaded into a cathode support 23 and must be accurately positioned relative to the first grid in order to produce an electron beam of the desired beam width and intensity.

Figure 2A:
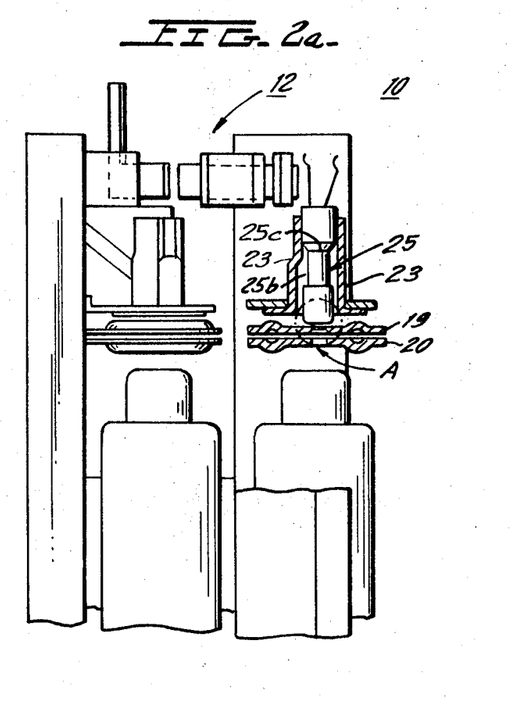
FIG. 2a shows an elevational view, partly sectionalized, of an electron gun structure of the type shown in FIG. 1a further showing one electron gun after insertion of a cathode.

FIG. 2a shows an electron gun structure of the type shown in FIGS. 1a and 1b in which the cathode has already been loaded and welded. The cathode 25 is shown positioned within support 23 of electron gun 12. Considering the detail-view shown in FIG. 2b, which is an enlarged reproduction of the encircled portion A of FIG. 2a, the spacing between the bottom surface 25a of cathode 25 and the top surface of first grid 19 can be seen to be quite small and, in one practical embodiment, is of the order of 0.004 to 0.0070 inch. The complexity of positioning such components results from the relatively small size of the components and the small dimension to be maintained therebetween, and is further complicated by the fact that the region in which this spacing is desired cannot be viewed during the time in which the components are being accurately positioned.

Figure 2B:
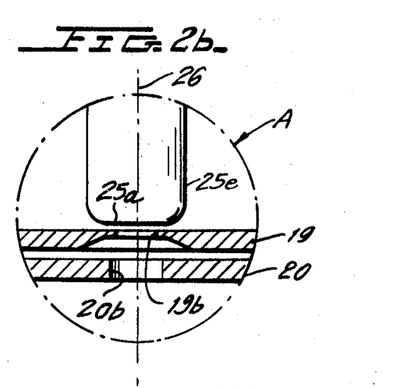
FIG. 2b shows a detailed view, partly sectionalized, of the loaded cathode and its associated control grid.

In one preferred embodiment, the cathode 25 is comprised of a first cylindrical-shaped member 25b having a shoulder 25c joining the smaller and larger diameter sections, with the larger diameter section being located at the open end of the cathode. The bottom end of portion 25b is fitted with a cap 25c whose bottom surface 25a confronts the opposing surface of first grid 19 and is centered so that its longitudinal axis 26 is concentric with the center of the opening 19b in first grid 19 and with the center in the opening 20b in second grid 20.

Figures 3A, 3C, 7:
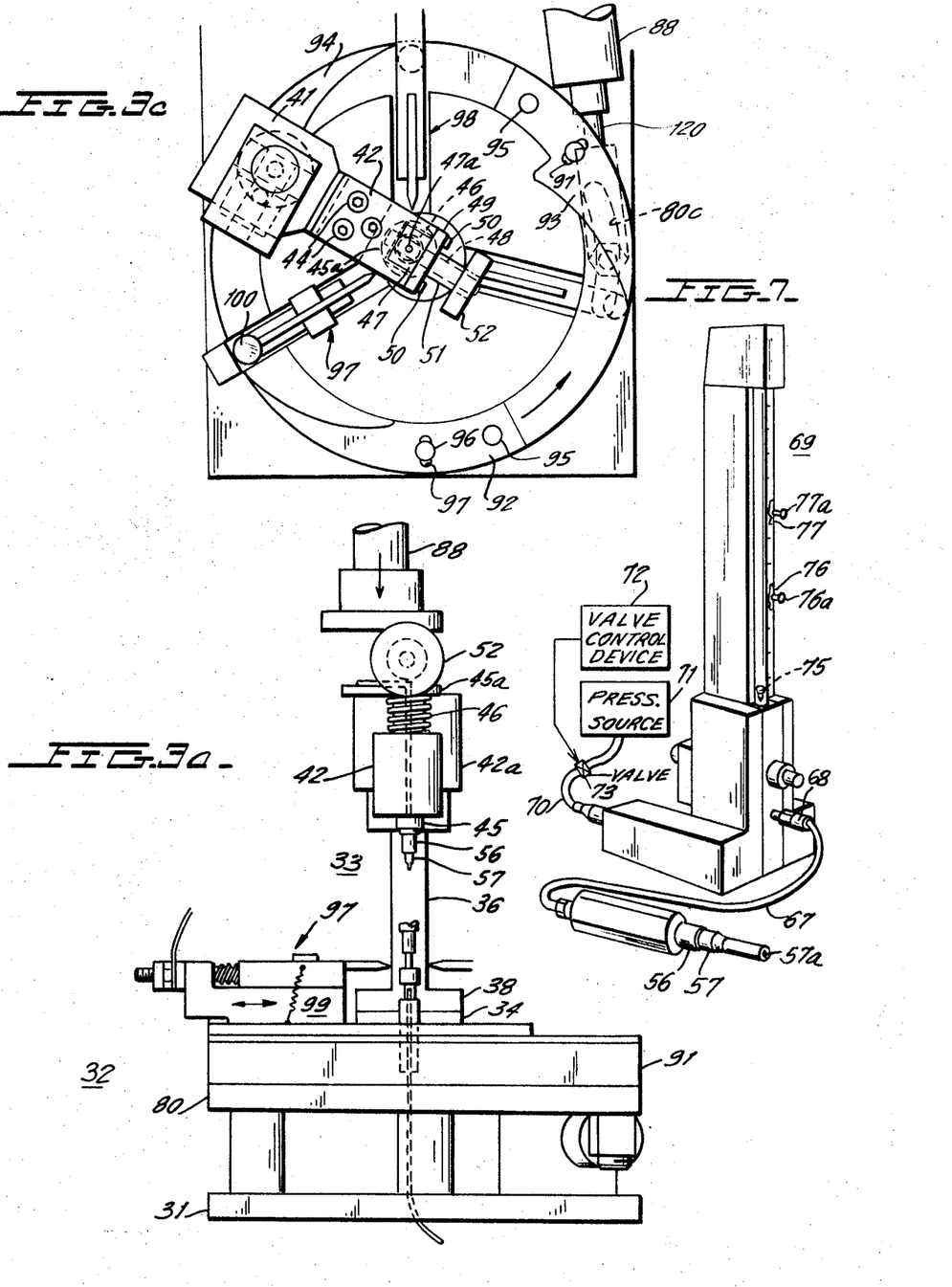
FIG. 3a shows a front elevational view of the loading and welding apparatus for precisely loading and welding cathodes into electron gun devices of the type shown in FIGS. 1a—2b.
FIG. 3c shows a top plan view of the apparatus of FIGS. 3a and 3b.
FIG. 7 shows a perspective view of an air gauge employed with the apparatus of FIGS. 3a through 3c.
Figure 3B:
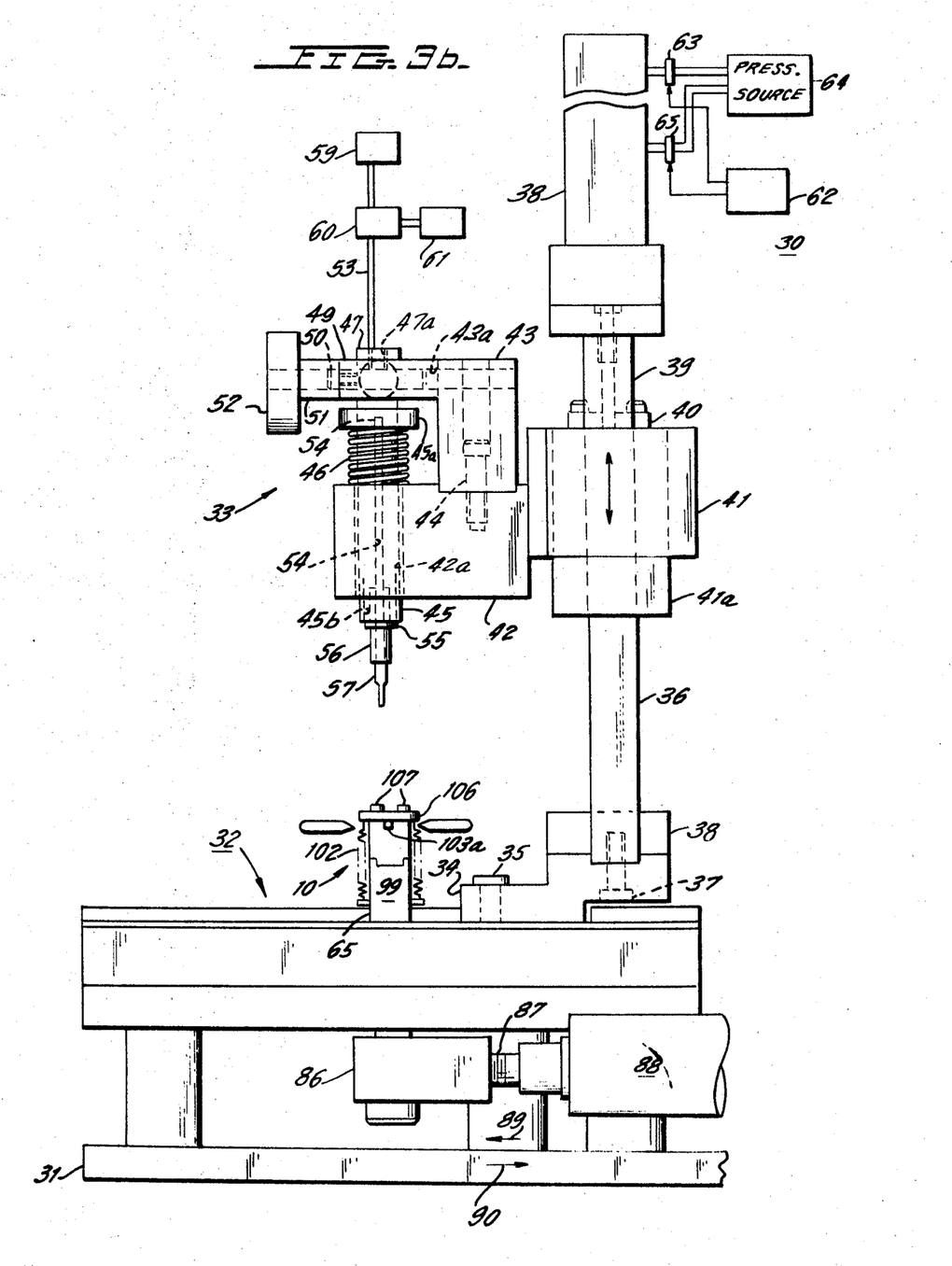

FIGS. 3a through 3c are front, side and top views, respectively, of the cathode loading and welding apparatus for loading and welding the cathodes of the type described hereinabove into electron guns of the type shown in FIGS. 1a and 1b. The apparatus 30 is comprised of a baseplate 31 upon which the welding assembly 32 and cathode loading assembly 33 is positioned.

The cathode loading assembly 33 is comprised of a base member 34 mounted upon the welding assembly 35 and supporting a shaft 36 by fastening means 37, which shaft has a square cross-sectional configuration for accurate alignment of the loading apparatus by preventing any rotational movement of the apparatus about the shaft when operated. An initial stop-block 38 is positioned upon base member 37 and operates to provide the coarse positioning of the cathode in conjunction with the reciprocating cathode loader assembly in a manner to be more fully described.

An air cylinder 38a is mounted upon the top of shaft 36 and, while not shown in detail, is provided with a hollow cylinder for supporting a reciprocating piston. The piston, when moved downward, couples its motion through a piston rod 39 which, in turn, is joined to a piston rod bracket 40 near its lower end for moving the entire assembly downwardly. Bracket 40 is fixed to a sleeve 41 which, in turn, is rigidly secured to a bushing 41a having ball bearings (not shown) slidably engageable with the periphery of square shaft 36, moving the entire assembly vertically downward until bushing 42 bears against the top surface of initial stop-block 38. By operating the air cylinder in the reverse direction, the piston (not shown) moves vertically upward, causing the piston rod 29 to move vertically upward and lift the cathode loader assembly to the upper position, as shown in solid line fashion in FIGS. 3a and 3b.

Collar 41 has a projecting portion 42 extending radially outward therefrom. This arm 42 has mounted thereon an L-shaped cam arm 43 secured to arm 42 by fastening means 44. Arm 42, which may be referred to as a carrier arm, is provided with a vertically aligned opening 42a for receiving a probe shaft 45 whose upper end is provided with a head portion 45a. A helical spring 46 encircles the upper portion of probe shaft 45 and has its lower end bearing against the upper surface of carrier arm 42 and its upper end bearing against the underside of shaft head 45. Spring 46 normally biases probe shaft 45 in the upward vertical direction, causing the upper surface of head 45a to bear against the periphery of a cam member 47. Cam 47 may, for example, be a metallic roller with a central opening which is eccentric relative to its circular periphery, or alternatively, may have an eccentric periphery. The opening of cam 47 receives and is rigidly secured to a shaft 48 positioned to rotate freely within an elongated opening 43a provided in L-shaped arm 43. One surface of cam member 47 bears against an end cap 49 rigidly secured to L-shaped arm 43 by fastening members 50,50. Shaft 48 extends beyond end cap 49 through a sleeve 51 and is rigidly secured to a fine adjustment handle 52. Rotation of fine adjustment handle 52 is imparted to shaft 48 which causes rotation of cam 47. The eccentric periphery of cam 47 bears against the top surface of probe shaft cap 45a, causing the probe shaft to move either upwardly or downwardly, depending upon the position of the eccentric cam at any given moment or its direction of rotation, by a very minute distance so as to provide for a fine adjustment of cathode positioning in a manner to be more fully described.

Eccentric roller 47 is provided with a centrally located grooved portion 47a to provide sufficient clearance for a vacuum line 53 which is coupled through an axially aligned opening 54 extending through the entire length of probe shaft 45. The bottom end of probe shaft 45 is provided with a wider diameter opening 45b which receives and positions an insulating sleeve 55 which, in turn, receives and positions a mandrel holder 56 which further, in turn, receives and positions a mandrel 56. All of the members 55 through 57 have central openings which communicate with the opening 54 for coupling a vacuum source 59 to the mandrel. From a consideration of the detail-view of FIG. 4, it can be seen that the mandrel 57 is provided with a tapered portion 57b which conforms to the tapered portion 25c of cathode member 25. These two conforming contours accurately locate the cathode relative to the mandrel.

Figures 4, 6A, 6B, 6C:
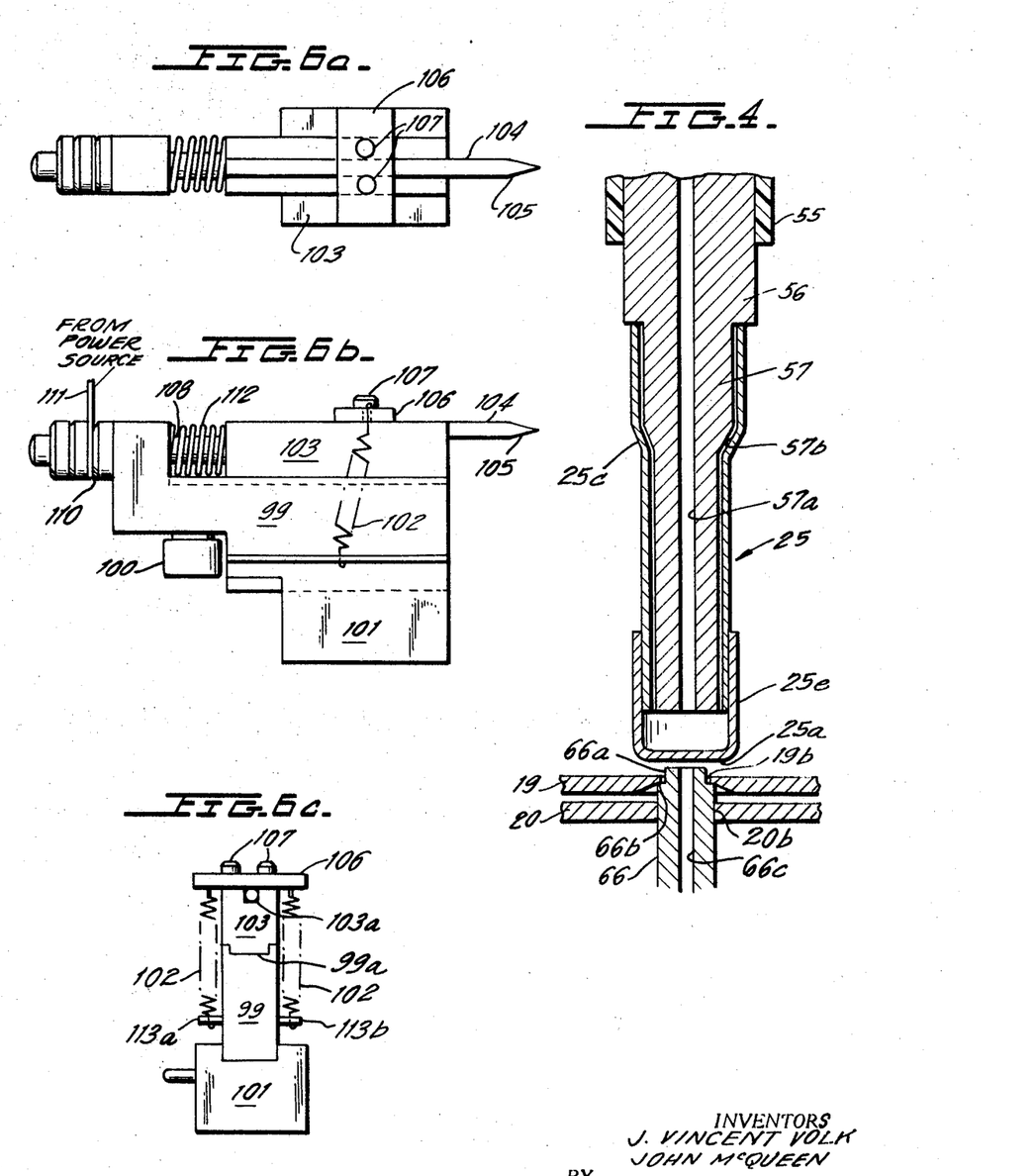
FIG. 4 shows a detail-view of a portion of the electron gun, with the cathode and air guage probe in the loading and measurement position.
FIGS. 6a through 6c are top, side and front end views of a welding subassembly of the type shown in FIGS. 5a and 5b.

The cathode member 25 is mounted upon mandrel 57 by pushing the open end of the cathode upon the mandrel until the conforming tapered portions are aligned in the manner shown in FIG. 4. The cathode is maintained in this position by coupling the vacuum source 59 to the mandrel longitudinal opening 57a to create a vacuum between these components and thereby hold the cathode in position. The vacuum source may be coupled to the mandrel through a valve 60 operated by a control device 61 which may, for example, be a switch conveniently located relative to the operator, which switch may either be a hand-operated switch or a foot-operated treadle, depending only upon the needs of the user.

Once the cathode is loaded in the manner described, and the electron gun structure is loaded upon the welding apparatus in a manner to be more fully described, the mandrel-carrying arm may be lowered into position through the operation of a control device 62 which selectively opens a control valve 63 between pressure source 64 and air cylinder 38a. This causes the collar and mandrel assembly to move downwardly until bushing 42 strikes against initial positioning plate 38 to "roughly" position the cathode relative to the grid electrode. Upon completion of the welding operation which will be more fully described hereinbelow, control device 62 selectively closes control valve 63 and opens control valve 65, causing the air cylinder piston (not shown) and hence the mandrel assembly to be lifted upwardly in readiness for the next cathode loading and welding operation.

The table upon which the welding apparatus and mandrel assembly is mounted is further provided with a probe holder and electron gun holder 65 in which an electron gun structure 10 of the type shown in FIGS. 1 and 1b is positioned. Preferably, the electron gun structure holder is provided with keying means for orienting the location of one gun (11, 12 or 13, as shown in FIGS. 1a and 1b) relative to the cathode to be lowered therein. With the electron guns positioned in this manner, it can be seen that the probe 66 (not especially FIG. 4) which is a narrow, elongated member, extends upwardly and through the fourth, third, second and first grid electrodes (see FIG. 1a) so that its uppermost end portion 66a extends through opening 19b of the first grid electrode and its shoulder 66b bears against the marginal portion of the first grid electrode which surrounds the opening 19b. Shoulder 66b acts to accurately position the probe in the manner shown. The elongated probe is provided with a central opening 66c which is coupled through a piece of tubing 67 to a fitting 68 provided on air gauge 69. Air gauge 69 is further provided with a second piece of tubing 70 which is coupled to a pressure source for feeding nitrogen to the air gauge structure and to probe 66. A nitrogen pressure source 71 is utilized in preference to an air pressure source, due to the noncontaminating properties of nitrogen. However, the operation of the gauge, whether utilizing air or nitrogen, is substantially the same. Pressure source 71 may be isolated from the gauge 69 by means of a control valve 73 which, in turn, is operated by a control source 72 which, although not shown, may be operated either by a hand-operated switch or a foot-operated treadle conveniently located relative to the operator.

Gauge 69 is provided with a transparent tubular member 74 containing a float member 75 which rises within the hollow transparent tube 74 in a manner to be more fully described.

A pair of adjustable pointers 76 and 77 having setscrews 76a and 77a determine the tolerance limits between which the float valve is positioned during the fine adjustment operation.

Considering FIG. 4 in conjunction with FIG. 7, it can be seen that the orifice 66c in probe 66 is positioned in substantially close proximity to the bottom surface 25a of cathode cup portion 25c. The amount of nitrogen permitted to escape between the bottom of cathode cup 25c and the orifice creates a back pressure within the gauge assembly that causes the float 75 within the transparent column to move to a specific height. For example, if the spacing between the orifice and the cathode is great, the float will be positioned toward the lower end of the transparent column. Conversely, if the spacing between cathode and probe orifice is decreased, the float will rise higher within the transparent column. By appropriate calibration of the gauge, accurate positioning of the cathode relative to the probe orifice may be obtained. The operator, through manipulation of the cam handwheel 52 (see FIG. 3b) and viewing of the air column can very accurately position float 75 between the pointers 76 and 77 and thereby accurately position the cathode relative to the grid.

Once the cathode is accurately positioned relative to the grid, the welding operation may then be performed.

Figure 5A:
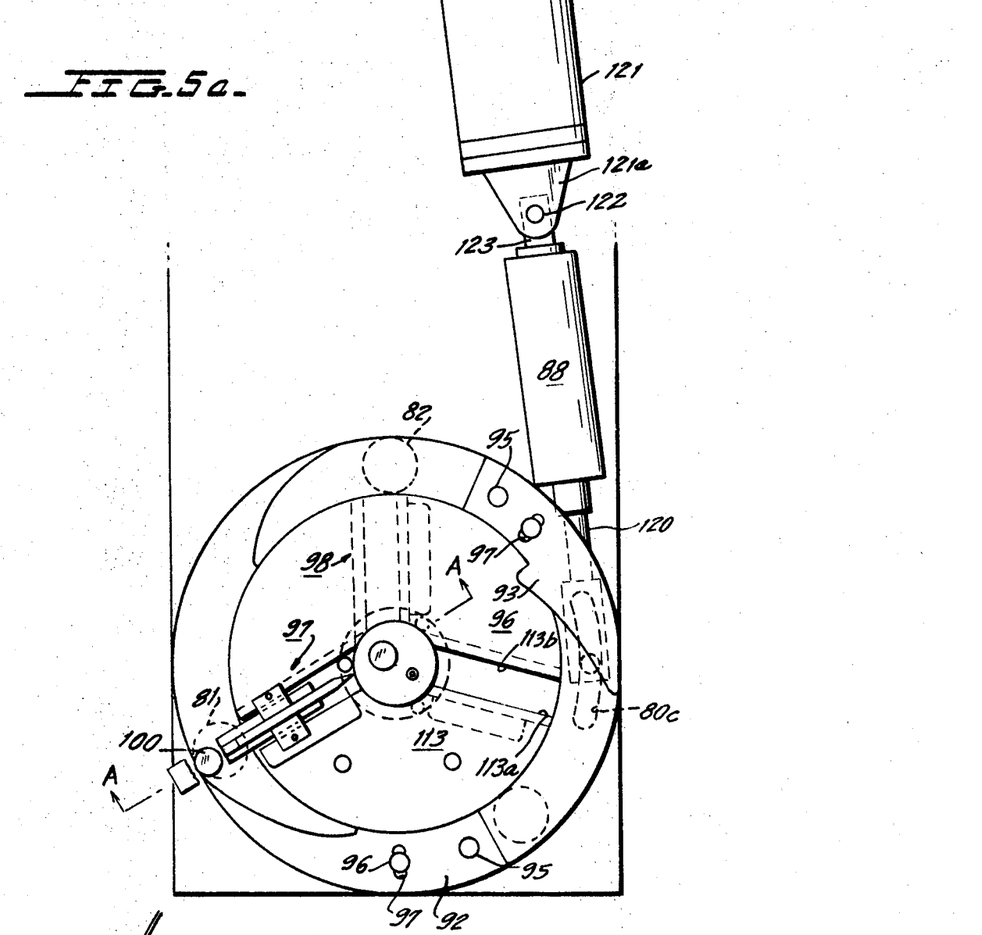
FIG. 5a shows a top plan view of the welding apparatus of the assembly of FIGS. 3a through 3c.
Figure 5B:
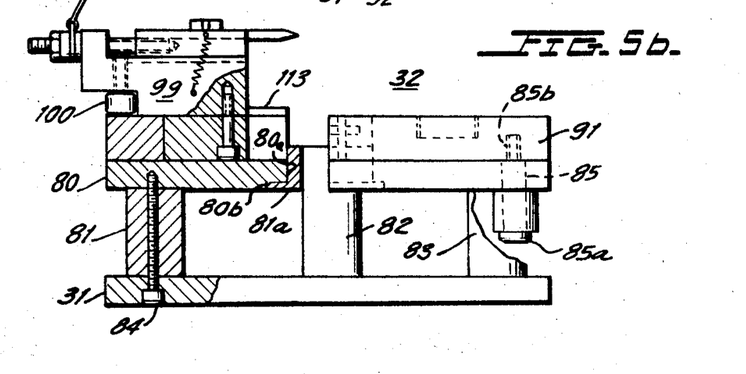

Considering FIGS. 5a through 6c, in conjunction with FIGS. 3a through 3c, the welding apparatus 32 shown therein is comprised of a plate 80 secured to baseplate 31 by means of standoffs 81 through 83, which components are secured by means of threaded fasteners such as the threaded fastener 84 shown in FIG. 5b. The plate 80 is provided with a centrally located opening 80a which receives a collar member 81 having a circular flange 81a positioned within a widened portion 80b of opening 80a. Collar 81 serves as the means for positioning and supporting the lower end of the gauge assembly probe 66 as well as the means for positioning and supporting the electron gun structure.

Plate 80 is provided with an arcuate-shaped slot 80c which has a pin 85 extending therethrough. The head 85a of pin 85 rests against the bottom surface of an eyelet member 86 whose opposite end is threadedly engaged with a threaded piston rod 87 which cooperates with an air cylinder 88. Air cylinder 88 operates in much the same manner as air cylinder 38 of FIG. 3b in that a reciprocating piston member (not shown), when operated upon by appropriate air pressure, selectively moves the piston rod 87 in the directions shown by arrows 89 and 90 for manipulating the welding apparatus in a manner to be more fully described.

The reciprocating movement of piston rod 87, eyelet member 86 and pin 85 is imparted to a cam ring 91 by pin 85 whose forward end 85b threadedly engages a tapped aperture in the cam ring. Cam ring 91 has mounted thereupon three cam members 92 through 94. Each cam member is secured to ring 91 by means of a pin 95 and a second pin 96 which is rigidly secured to the cam ring 91 while being slidable within an elongated slot 97 to allow some pivotal movement of each cam member about its pivot pin 95. Each cam member cooperates with an associated welding unit 96 through 98, respectively, wherein a typical welding unit such as, for example, the welding unit 96 is shown in FIGS. 6a through 6c. The welding unit 96 is comprised of a carrier-block 99 having a cam follower roller 100 pivotally secured thereto. A slide-block 101 is rigidly mounted along the bottom edge of carrier-block 99. The associated cam member for welding unit 96 is positioned to the left of roller 100, causing the welding unit to move toward the right between guide means to be more fully described, while spring members 102, 102 operate to return the welding unit to its original position, in a manner to be more fully described.

The carrier-block 99 is provided with a guide channel 99a having sidewalls with undercut grooves for receiving an electrode block 103 having a mating configuration, as shown best in FIG. 6c, so as to enable the electrode block 103 to be slidable relative to the carrier-block 99. Carrier-block 99 is provided with an elongated groove 103a along its upper surface for receiving and rigidly mounting a welding electrode 104 whose forward edge is tapered, as shown at 105. The electrode is secured to block 103 by a fastening strap 106 in fastening means 107. The rear end of electrode block 103 is rigidly secured to shaft 108 whose left-hand end passes through a suitable opening in carrier-block 99 and is connected by suitable fastening means 110 to a conductor 111 for coupling to the power source of the welding apparatus. A helical spring 112 surrounds member 108 and has its left-hand edge bearing against carrier-block 99 and its right-hand end bearing against electrode block 103 so as to normally bias the electrode block toward the right relative to FIG. 6b. Member 108 may be joined to electrode 104 in any suitable manner, or alternatively, the two members may be integrally formed. Electrode block 103 may be formed of a suitable insulating material and an insulating sleeve may be positioned about member 108 so as to isolate any electrical energy applied through lead 111 from making an electrical path with carrier-block 99.

A cover plate 113 is positioned within the interior region of cam ring 91 (see FIG. 5b, for example) and is provided with three radially aligned elongated openings such as, for example, the opening defined by edges 113a and 113b. These edges are positioned on opposite sides of the carrier-block 99, as shown best in FIG. 6c, and confine the welding unit subassembly to reciprocating movement within the guide slots. The spring members 102, 102 have their upper ends coupled to bracket 106 and have their lower ends coupled to plate 113.

When a cam member, under rotation of the air cylinder assembly 88, urges against an associated roller 100, the welding unit subassembly is urged toward the center of the structure, as shown best in FIG. 5a, causing the spring members 102,102 to be charged. When the cam members are returned to their original position, the welding unit is returned to its original position under control of the charged springs 102,102. The spring member 108 provides a biasing force for firmly urging the tapered tip of each welding electrode against a cathode support member, while at the same time allowing for any slight deviations in positioning of the cathode support relative to the orientation of the three welding units. Although only one such welding unit has been described herein, it should be understood that the remaining three welding units operate in a similar manner.

As was described hereinabove, once the cathode loading device has accurately been operated to accurately position the cathode relative to its cathode support, a control device may be operated, either by a hand-operated switch or foot-operated treadle, causing the air cylinder 88 to rotate cam ring 91 and thereby move each of the welding unit subassemblies inwardly along respective radii until their forward tips touch up against three points substantially at 120° intervals around the cathode support member 23 (see FIGS. 1a and 2a). Each of the individual welding electrodes are then energized to substantially simultaneously produce three welds between the cathode 25 and the cathode support 23, assuring accurate positioning and adequate support of the cathode member. As was previously described, the mandrel 57 (see FIG. 3b) is electrically insulated from the remainder of the cathode loading assembly by means of the insulating sleeve 55 so that no components which may come into contact with the operator will be electrically energized.

The mandrel serves as the second or grounded electrode during the welding operation and may be electrically connected by a suitable lead (not shown) to the welding unit to establish an electrical path from the power source to each welding unit lead 111, electrode 105, cathode support 23, cathode 25 and mandrel 57 back to the power source through the aforesaid suitable lead. The insulation sleeve 55 serves to prevent a short circuit. The voltage level of the welding apparatus is low enough so as not to be harmful to the operator.

After forming the three discrete welds, the welding unit power source (not shown) is then deenergized and air cylinder 88 is operated to move its piston rod in the direction shown by arrow 120 so as to return the welding unit subassemblies to their outermost position in readiness for the next operation. The electron gun structure is then lifted from the mandrel, reoriented to the next position placing the next cathode support about to receive a cathode beneath the cathode loading assembly. The cathode loading assembly is operated to be moved downwardly to "roughly" position a cathode loaded upon its mandrel within its associated cathode support. Fine adjustment is made by manipulation of handwheel 52 until the gauge float is positioned within the tolerance pointers, at which time the welding operation is then reinitiated. As shown in FIG. 3c, the air cylinder 88 has its upper end pivotally mounted to a bracket 121 by means of a pivot pin 122 pivotally coupling the projection 123 of the air cylinder to bracket arm 121a by means of pin 122. This allows the air cylinder to experience some pivotal motion which is required as the result of the fact that the forward end of the connecting rod moves along an arcuate path as opposed to a perfectly linear path.

It can be seen from the foregoing that the present invention provides a novel method and apparatus for rapidly and accurately loading and welding cathodes of an electron gun device wherein the critical spacing between the cathode and its associated grid is very rapidly and accurately obtained in spite of the fact that the region in which the critical spacing must be provided is not visible to the eye as a result of the configuration of the components. Once a cathode element is so loaded and accurately positioned, the welding operation likewise takes place in a rapid and reliable manner leading to a significant simplification in the fabrication of such devices.

Although this invention has been described with respect to particular embodiments, it should be understood that many variations and modifications will now be obvious to those skilled in the art, and, therefore, the scope of this invention is limited not by the specific disclosure herein, but only by the appended claims.

What I claim is:

1. A method for accurately positioning and securing components of an electrical device through the use of a gas gauge having a probe having an outlet orifice and a visually observable gauge output indicator for indicating back pressure at the orifice comprising the steps of:
   positioning one of said components upon said probe;
   moving the other component toward said one component while maintaining axial alignment therebetween;
   halting said movement at the position which corresponds to the desired spacing observed on said indicator;
   joining said components while holding said other component in said position.

2. A method for accurately positioning the substantially flat face of a first electrical component relative to the plane of an opening in a second component joined to an electrical structure through the use of a probe having an outlet orifice comprising the steps of
   a. positioning said second component upon said probe so that said outlet orifice projects through said opening;
   b. applying a gas at a predetermined pressure to said probe;
   c. moving said first electrical component toward said orifice while maintaining axial alignment between said components;
   d. observing the back pressure imposed upon said orifice;
   e. halting said movement upon the observation of a predetermined back pressure and retaining said first component in the position representative of said predetermined back pressure;
   f. mechanically joining said first component to said structure while retaining said first component in said position.

3. The method of claim 2 wherein step (f) is further comprised of welding said first component to said structure.

4. Apparatus for accurately positioning and securing a first electrical component relative to a second electrical component joined to an electrical structure comprising:
   a gas gauge having a gas source; a probe having an outlet orifice and an indicator coupled to said probe and said gas source for generating a visually observable reading representative of back pressure imposed upon said orifice;
   a base for mounting said probe;
   loading apparatus positioned upon said base and having a reciprocally mounted carrier arm movable toward and away from said probe;
   mandrel means movably mounted on said arm for receiving said first component;
   said mandrel means including means for releaseably securing said first component to said mandrel means;
   means for supporting said structure upon said probe with said orifice projecting through an opening in said second component;
   said first component having a substantially flat surface portion confronting said opening;
   means for rapidly linearly moving said carrier arm toward said probe to a first position to roughly position said first component adjacent said second component and above said orifice;
   adjustable cam means mounted on said arm for linearly moving said mandrel means relative to said arm and said base through a small distance to precisely control the spacing between said first and second components by adjustment of the cam means to move said first component to a position representative of a predetermined back pressure reading displayed on said indicator.

5. The apparatus of claim 4 further comprising welding means mounted upon said base for joining said first component to said structure while said probe is maintained in said position.

6. The apparatus of claim 5 wherein said welding means is comprised of at least two welding assemblies each having a welding electrode;
   means mounted on said base for reciprocally guiding each of said welding assemblies substantially along radii extending outwardly from said probe;
   driving means for simultaneously moving said electrode assemblies inwardly along their respective radii to cause said electrodes to engage said structure at points adjacent said first component;
   energy means coupled to said electrode assemblies for energizing said electrodes to effect welds at said aforementioned points.

7. The apparatus of claim 6 wherein said driving means is further comprised of means for driving said electrode assemblies outwardly along their respective radii to release said electrodes from engagement with said structure.

8. The apparatus of claim 4 further comprising means for selectively moving said carrier arm toward and away from said probe.

9. The apparatus of claim 4 wherein said mandrel is provided with a central opening;
   a vacuum source coupled to said opening for holding a component mounted upon the open end of said mandrel on said mandrel;
   means for selectively coupling and decoupling said vacuum source and said mandrel opening.

10. The apparatus of claim 6 wherein said driving means is comprised of a rotatable ring;
   means for rotating said ring in a first and second direction;
   a plurality of cams coupled to said ring each having cam surfaces arranged to make sliding engagement with an associated welding assembly;
   means for biasing said assemblies outwardly along their respective radii;
   said cam means being adapted to simultaneously urge said assemblies inwardly along their respective radii against the force of said biasing means when said ring is rotated in a first direction.